United States Patent

Campbell et al.

[11] Patent Number: 5,161,327
[45] Date of Patent: Nov. 10, 1992

[54] PIPE PLANTER

[76] Inventors: Bruce Campbell, 5500 S. Everett, Chicago, Ill. 60637; Greg Drzewiecki, 7921 Trumbull, Chicago, Ill. 60652; Kenneth Hardy, 10211 S. Wallace, Chicago, Ill. 60628

[21] Appl. No.: 673,726

[22] Filed: Mar. 22, 1991

[51] Int. Cl.⁵ .............................................. A01G 9/24
[52] U.S. Cl. .............................................. 47/82
[58] Field of Search ............... 47/82, 83, 59, 62, 66, 47/67, 79, 41.13, 48.5

[56] References Cited

U.S. PATENT DOCUMENTS

| | | |
|---|---|---|
| D. 245,681 | 9/1977 | Farner . |
| 815,060 | 3/1906 | Beebe . |
| 2,670,571 | 10/1949 | Waldron . |
| 2,983,472 | 5/1961 | Bowling . |
| 4,075,785 | 2/1978 | Jones ............................ 47/62 |
| 4,173,843 | 11/1979 | Marble . |
| 4,211,034 | 7/1980 | Piesner ......................... 47/62 |
| 4,255,896 | 3/1981 | Carl .............................. 47/62 |
| 4,324,069 | 4/1982 | Flagg . |
| 4,389,813 | 6/1983 | Jaques et al. ................ 47/83 |
| 4,420,902 | 12/1983 | Rayner ......................... 47/83 |
| 4,649,667 | 3/1987 | Kitograd . |
| 4,658,540 | 4/1987 | Hougard ....................... 47/67 |
| 4,669,217 | 6/1987 | Fraze ............................ 47/59 |
| 4,676,023 | 6/1987 | Mori ............................. 47/82 |
| 4,887,386 | 12/1989 | Minshull ..................... 47/48.5 |
| 5,010,686 | 4/1991 | Rivest .......................... 47/62 |

Primary Examiner—David A. Scherbel
Assistant Examiner—Michele A. Van Patten
Attorney, Agent, or Firm—Speckman & Pauley

[57] ABSTRACT

An apparatus suitable for growing plants comprises a tubular member enclosed on both ends by vertically oriented fittings to retain liquid therein. The tubular member has openings through a wall sized to receive a plant vine and positioned to retain liquid in said tubular member. The tubular member is preferably a transparent, plastic pipe.

10 Claims, 3 Drawing Sheets

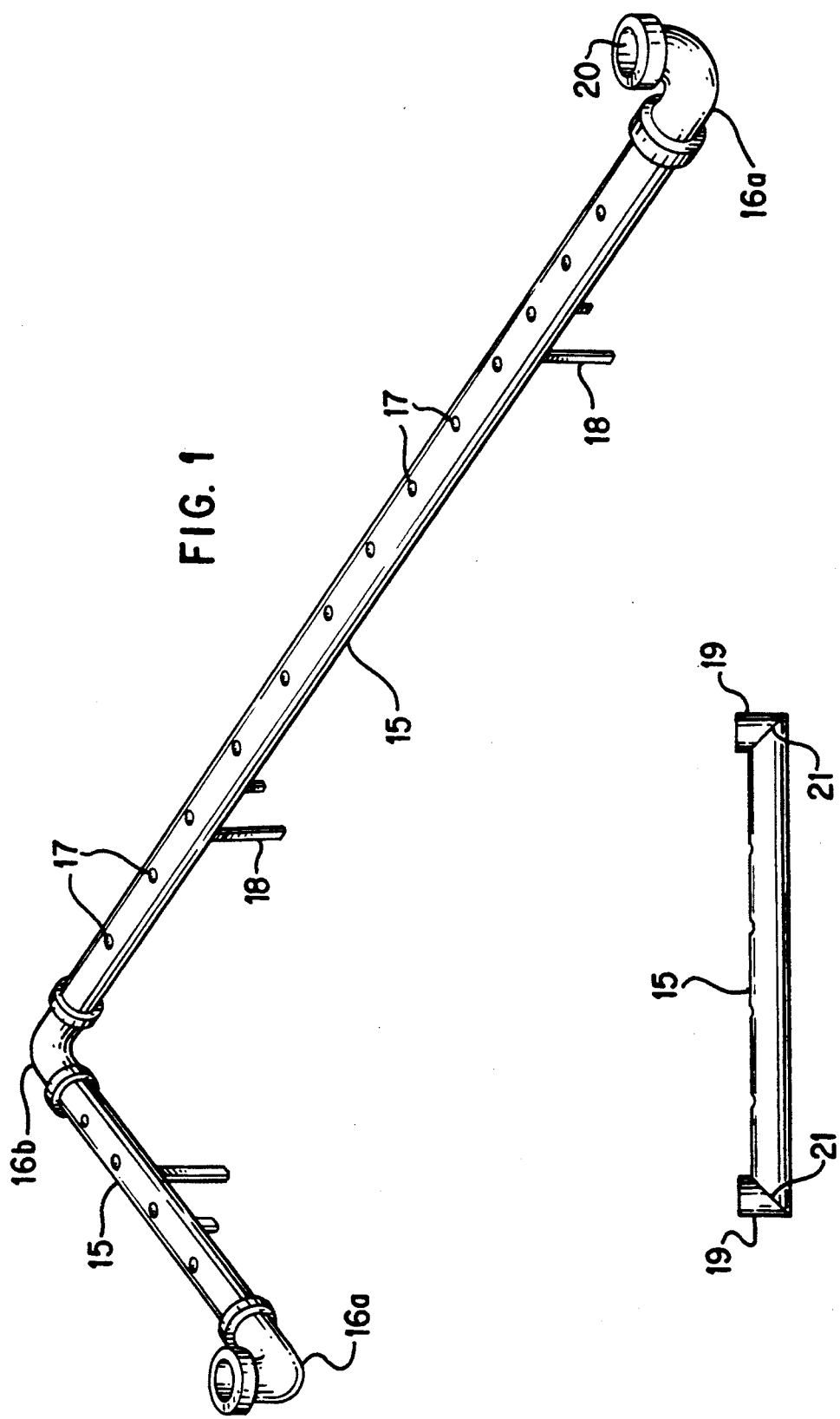

PIPE PLANTER

BACKGROUND OF THE INVENTION

1. Field of the Invention

This invention relates to a decorative apparatus for growing plants constructed out of PVC pipe and fittings having sizes and dimensions easily custom fitted to available space.

2. Description of the Prior Art

Many types of planters are known in the prior art including window boxes and decorative pots, most of which require that the plant be rooted in soil or other solid material. For example, U.S. Pat. No. 2,670,571 discloses a flower growing container having a generally oval shape with holes positioned at reasonable intervals to permit plants contained within to grow through the holes. Plants are rooted in soil and positioned in pots within the container in a manner which encourages the plants to grow through the holes. Water flows along the bottom of the container which forms a water well, providing moisture to feed the growing plants. To maintain relative distances between the individual plants, ribs are positioned within the planter.

U.S. Pat. No. 4,324,069 discloses a method and apparatus for periodically supplying liquid to the root system of plants utilizing pneumatic pressure to displace liquid in a chamber positioned beneath the plants to a higher level accessible to the plant root system. When the pneumatic pressure in the chamber is released, the liquid reenters the chamber, lowering the liquid level below the plant root system. The system provides cyclic feeding of liquid to plant roots, agitation and oxygenation of the liquid during use, reuse of chemically enriched liquid, flexibility in spacing plants during the growth cycle, and the ability to grow plants in individual containers for ease of handling and transport.

Other containers for growing plants are disclosed in U.S. Pat. No. Des. 245,681 which discloses a design for a hydroponic growing system utilizing pans and a pump for circulating water and U.S. Pat. No. 4,173,843 which discloses a decorative article constructed to utilize the flower and leaves of a bird of paradise flower to simulate the cuckoo-like road runner bird indigenous to the Southwestern U.S. desert area. U.S. Pat. No. 4,649,667 discloses a multipurpose collapsible container useful for growing plants under restricted space conditions. Each of the panels of the container has openings incorporated along its top edge which serve as containers for individual plants.

SUMMARY OF THE INVENTION

It is an object of this invention to provide a decorative planter.

It is another object of this invention to provide a planter which can be easily custom fitted to satisfy specific space requirements.

It is still another object of this invention to provide a planter for growing plants without soil or other solid material.

These and other objects of this invention are achieved by a planter constructed of pipe, preferably plastic, or other tubular member comprising fittings on its ends to prevent liquid from leaking out and openings through the pipe wall sized to receive a plant vine and positioned to retain liquid in the pipe. The pipe is preferably transparent, although translucent or opaque pipes may also be used.

In accordance with one embodiment of this invention, the planter is constructed of multiple pipe sections joined together by fittings, such as elbows and tees, preferably white or clear PVC socket fittings using solvent cement in a known manner.

In accordance with another embodiment of this invention, the planter is constructed of extruded or cast clear acrylic plastic pipe without the use of fittings. The ends of the pipe are cut at 45° angles and the surfaces lightly sanded. The ends are then turned as required to fit together and attached to each other using a solvent cement.

In accordance with still another embodiment, the planter is constructed of multiple pipes joined together at right angles also by cutting the ends of the pipes at a 45° angle and joining them together using a solvent cement.

In accordance with yet another embodiment of this invention, acrylic pipe is heated until it becomes pliable and then bent to the desired configuration. In this way, the ends of the pipe can be upturned as a means for retaining liquid within the pipe, thereby obviating the need for fittings secured to the pipe ends.

In accordance with a preferred embodiment of this invention, the planter is supported by legs secured to the underside of the pipe to enable placement of the planter on a flat surface.

In accordance with another preferred embodiment of this invention, the planter is suspended from an appropriate support structure by a loop wire or other suitable hanger secured to the planter. By suspending the planter, for example from the ceiling of a room, additional planters can be suspended from the suspended planter creating a multi-tiered arrangement.

In still another preferred embodiment, a liquid circulating pump is connected to the planter such that liquid is withdrawn from the fitting enclosing one end of the pipe comprising the planter and introduced into the fitting enclosing the other end of the pipe.

In accordance with another embodiment of this invention, each tier of a multi-tiered arrangement is positioned in the same plane as the other tiers and is alternatingly slightly off horizontal, thereby creating a cascading appearance. An opening is provided in the fitting secured to the lowered end of each pipe comprising each tier such that a portion of the liquid in the uppermost pipe flows out of the pipe and into an opening in the fitting of the pipe directly below it. Liquid flow continues in this manner until the liquid reaches the bottom tier at which point it is recirculated by a pump to the uppermost tier.

It is apparent that the components comprising the planter of this invention permit a variety of configurations all of which are based upon a fundamental unit of construction, namely, a tubular member, fittings enclosing the ends of the tubular member and openings in the tubular member walls to accommodate plant vines and provide a means for introducing a liquid into the tubular member.

These and other objects and features of the invention will be more readily understood and appreciated from the description and drawings contained herein.

BRIEF DESCRIPTION OF THE DRAWINGS

FIG. 1 is an isometric front view of a pipe planter according to one embodiment of this invention;

FIG. 2 is a side view of a pipe planter according to another embodiment of this invention;

DESCRIPTION OF PREFERRED EMBODIMENTS

Figure 3:
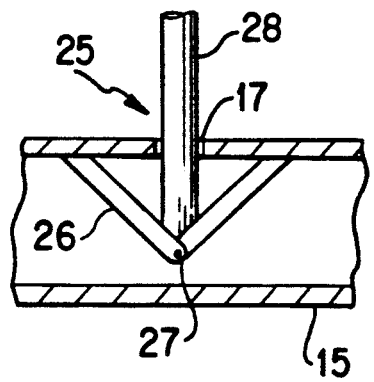
FIG. 3 is a cross-sectional view of a suspension means in accordance with one embodiment of this invention.

FIG. 1 shows an embodiment of this invention combining two basic units which comprise this invention. A basic unit is comprised of tubular member 15 enclosed on both ends by end means for retaining liquid in tubular member 15 and having plant vine opening 17 sized to receive a plant vine and positioned to retain liquid in tubular member 15. As used in this specification and claims, tubular member 15 is any hollow, preferably elongated body having one or more walls. Tubular member 15 is preferably transparent, plastic pipe. Tubular member 15 may also be translucent or opaque. In the embodiment shown in FIG. 1, end means for retaining liquid in tubular member 15 comprises elbow fitting 16a secured in a leak tight manner to the ends of tubular member 15. Elbow fitting 16a is positioned so that liquid within tubular member 15 does not leak out of open elbow leg 20 of elbow fitting 16a. In another embodiment shown in FIG. 2, end means for retaining liquid in tubular member 15 comprises an end tubular member 19 secured to an end of tubular member 15 at pipe joint 21. Pipe joint 21 is formed by cutting the end of tubular member 15 at an angle which complements the angle at which one end of end tubular member 19 is cut, preferably 45°, and securing the cut end of end tubular member 19 to the complementary end of tubular member 15 in a leak tight manner using a solvent cement. It is apparent that other end means for retaining liquid in tubular member 15 are suitable, such as a cap placed in a leak tight manner over each end of tubular member 15.

Tubular member 15 comprises plant vine opening 17 through a wall of tubular member 15 sufficiently sized to permit insertion of a plant vine into tubular member 15. Plant vine opening 17 is disposed in the wall of tubular member 15 such that liquid within tubular member 15 does not leak out through plant vine opening 17.

Figure 7:
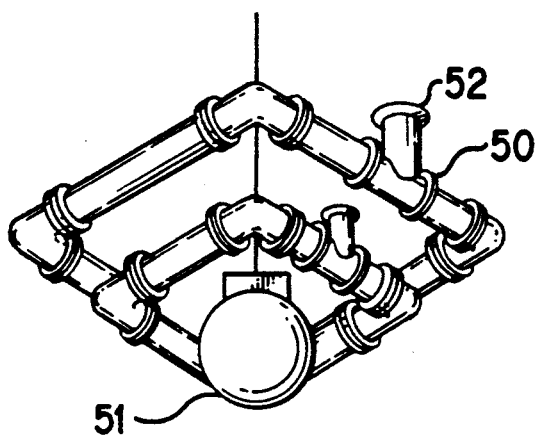
FIG. 7 is an isometric bottom view of a pipe planter in accordance with yet another embodiment of this invention.

Multiple tubular members 15 may be joined together by elbow fitting 16b, by straight connectors (not shown), by tee fitting 50 shown in FIG. 7, and combinations thereof to create different configurations of the planter. For configurations having no free ends, open tee leg 52 of tee fitting 50 is used to provide water to the planter.

In a preferred embodiment of this invention, support means for supporting tubular member 15 on a table or other surface are secured to a wall of tubular member 15. In the embodiment shown in FIG. 1, support means comprises legs 18 secured to a wall of tubular member 15 generally opposite plant vine opening 17.

In another preferred embodiment of this invention, tubular member 15 has suspension means for suspending it from a ceiling or other suitable structure. As shown in FIG. 3, suspension means comprises suspension anchor 25 inserted through one of plant vine opening 17. Suspension anchor 25 is comprised of anchor legs 26 connected at an end by pin 27 to mount 28 which extends up through plant vine opening 17. Anchor legs 26 rotate around pin 27 when weight is applied to the ends of anchor legs 26 opposite the end connected to mount 28, securing suspension anchor 25 inside tubular member 15.

Figure 4:
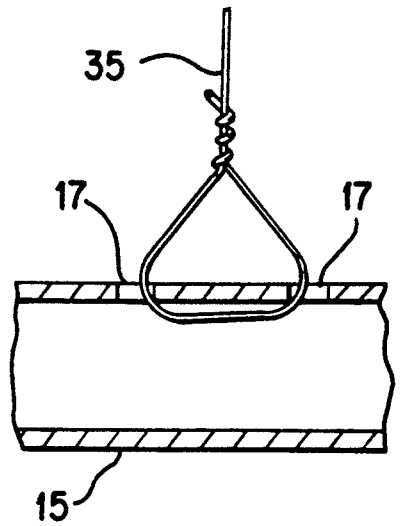
FIG. 4 is a cross-sectional view of another suspension means in accordance with another embodiment of this invention.

FIG. 4 shows another suspension means suitable for use in this invention. Hanger 35 constructed of flexible material such as wire or cord is threaded through two plant vine openings 17 and tied so as to form a loop. The free upper end of hanger 35 is used to suspend tubular member 15 from the ceiling or other suitable structure. It is apparent that other suspension means are also suitable for use in this invention, including merely looping hanger 35 around the outside of tubular member 15, and description of specific suspension means in this specification is not intended to place any limitations thereon.

Figure 5:
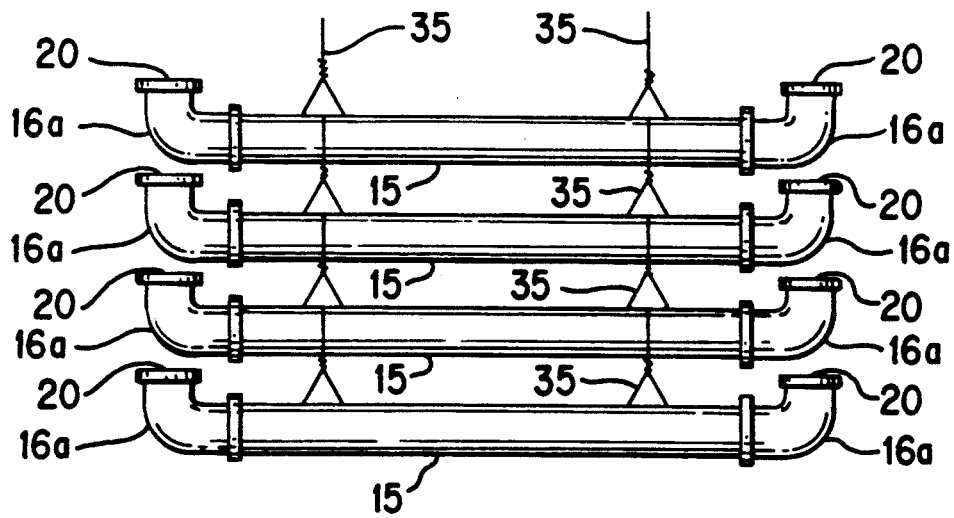
FIG. 5 is a front view of a tiered pipe planter in accordance with another embodiment of this invention.
Figure 6:
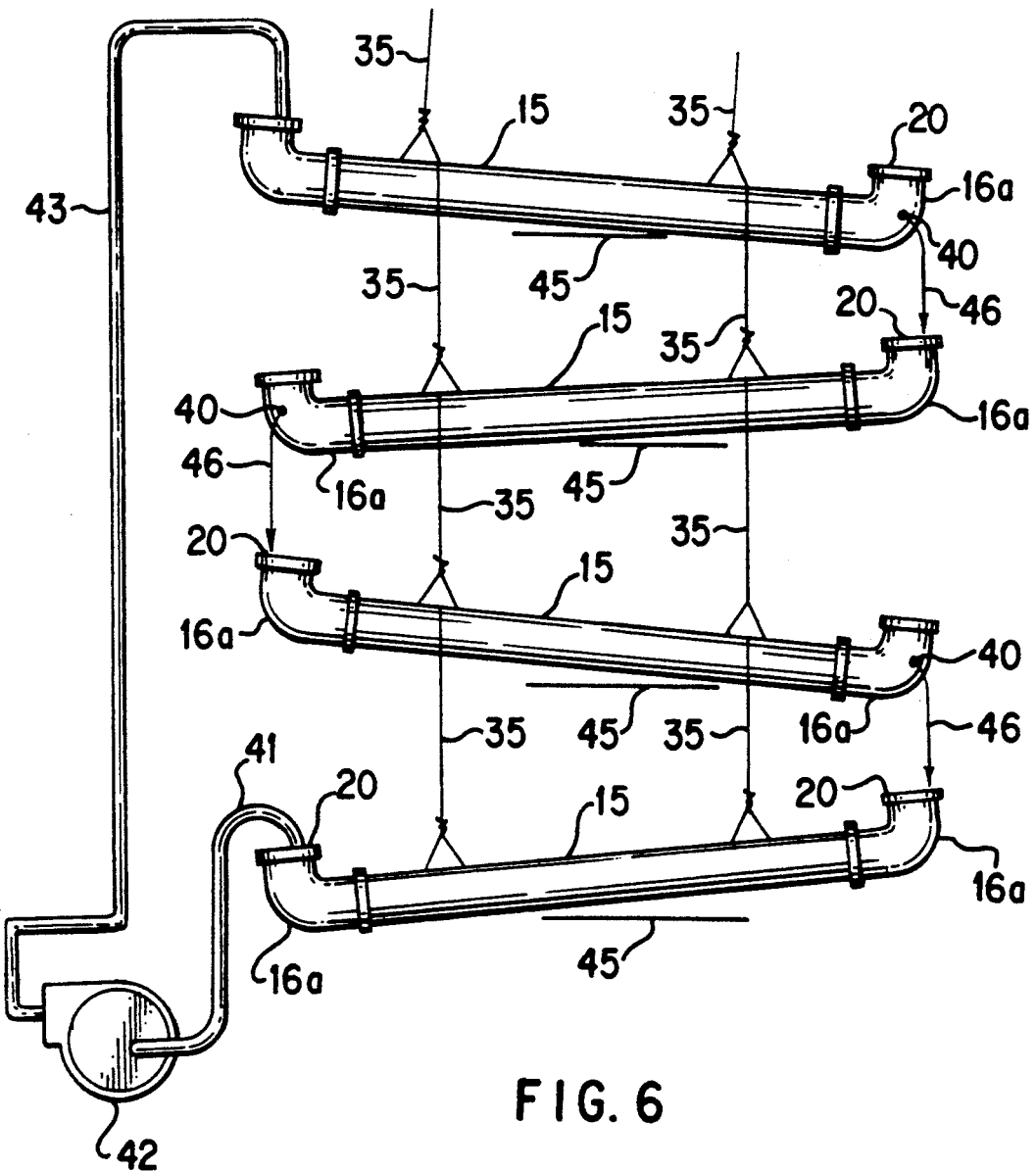
FIG. 6 is a front view of a cascading tiered pipe planter in accordance with another embodiment of this invention.

As shown in FIGS. 5 and 6, suspension means may also be used to create tiered embodiments of this invention. In the embodiment shown in FIG. 5, individual tubular members 15 enclosed on each end by elbow fitting 16a are suspended one below another in the same vertical plane by hangers 35. Although suspended in this manner, each tubular member 15 is an individual unit suitable for growing plants. In the embodiment shown in FIG. 6, individual tubular members 15 enclosed on each end by elbow fitting 16a are also suspended one below the other in the same vertical plane by hangers 35. However, this embodiment comprises circulation means for circulating a liquid through tubular members 15 in which tubular members 15 are an integral part of the circulation means. Each tier of tubular member 15 is suspended such that one end is slightly higher than the other end. The angle between the wall of tubular member 15 and horizontal, indicated by reference numeral 45, is shown in FIG. 6 exaggerated for purposes of illustration. In this way, liquid within tubular member 15 flows toward the lower end. Elbow fitting 16a secured to the lower end of tubular member 15 has drain opening 40 through which a portion of the liquid in tubular member 15 of an upper tier flows into open elbow leg 20 of elbow fitting 16a secured to the higher end of tubular member 15 comprising the next lower tier as shown by arrows 46. In a similar manner, liquid in tubular member 15 of the lower tier flows toward the lower end of tubular member 15 and through drain opening 40 into open elbow leg 20 of elbow fitting 16a secured to the higher end of tubular member 15 comprising the next lower tier, and so on. To complete the circuit for liquid circulation, one end of outlet hose 41 is disposed to withdraw liquid from the lower end of tubular member 15 comprising the lowest tier. The other end of outlet hose 41 is connected to an inlet side of pump 42 which pumps liquid withdrawn through outlet hose 41 through inlet hose 43, one end of which is connected to an outlet side of pump 42. The other end of inlet hose 43 is disposed in open elbow leg 20 of elbow fitting 16a secured to the higher end of tubular member 15 comprising the highest tier. Drain opening 40 is disposed in elbow fitting 16a such that if pump 42 stops, liquid flow stops while retaining a sufficient amount of liquid within each tubular member 15 to satisfy the needs of plants growing therein.

FIG. 7 shows another embodiment of this invention in which tubular members 15 are assembled such that there are no open elbow leg 20 for introducing liquid into tubular members 15. This embodiment, shown suspended around light fixture 51, utilizes tee fitting 50 having open tee leg 52 through which liquid may be added.

It is apparent that the apparatus described herein is suitable not only for growing plants, but also, depending upon various dimensions and pipe sizes, is suitable for other applications such as an aquarium. For example, to use the apparatus as an aquarium, the openings in open elbow legs 20 would be covered with a screen and plant vine openings 17 sized to prevent fish from jumping out.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A decorative apparatus for growing plants comprising:

at least one transparent tubular member
   containing a liquid
   and having at least one opening through a wall of said tubular member sized to receive a plant vine; and
   an elbow fitting secured to an end of said tubular member positioned to receive and retain said liquid in said tubular member.

2. A decorative apparatus for growing plants in accordance with claim 1, wherein said tubular member is a pipe.

3. A decorative apparatus for growing plants in accordance with claim 1, wherein said tubular member is at least one of plastic, ceramic and glass.

4. A decorative apparatus for growing plants in accordance with claim 1 further comprising support means for supporting said tubular member secured to said wall of said tubular member.

5. A decorative apparatus for growing plants in accordance with claim 1 further comprising suspension means for suspending said tubular member from a support.

6. A decorative apparatus for growing plants in accordance with claim 1 further comprising a liquid circulation pump.

7. A decorative apparatus for growing plants in accordance with claim 2, wherein said pipe is at least one of plastic, ceramic and glass.

8. A decorative apparatus for growing plants in accordance with claim 7 further comprising support means for supporting said pipe secured to said wall of said pipe.

9. A decorative apparatus for growing plants in accordance with claim 8 further comprising suspension means for suspending said pipe from a support.

10. A decorative apparatus for growing plants in accordance with claim 9 further comprising a liquid circulation pump.

* * * * *